United States Patent [19]
Depenbrock

[11] 3,909,697
[45] Sept. 30, 1975

[54] ARRANGEMENT FOR SUPPLYING DIRECT CURRENT TO A CONSUMER FROM AN ALTERNATING CURRENT SOURCE WITH INTERPOSED TRANSFORMER AND RECTIFIER ESTABLISHING PERIODIC RAPID CHANGES IN TRANSFORMATION RATIO

[75] Inventor: Manfred Depenbrock, Bochum-Stiepel, Germany

[73] Assignee: BBC Brown Boveri & Company Limited, Baden, Switzerland

[22] Filed: July 31, 1974

[21] Appl. No.: 493,608

[30] Foreign Application Priority Data
Aug. 4, 1973 Germany.......................... 2339576

[52] U.S. Cl.................... 321/8 R; 321/9 A; 321/10; 321/18; 321/47; 323/43.5 S; 323/48
[51] Int. Cl.²......................................... H02M 7/17
[58] Field of Search ......... 321/8 R, 9 A, 10, 18, 20, 321/47; 323/43.5 S, 45, 48

[56] References Cited
UNITED STATES PATENTS
3,182,248  3/1965  McNamee............................ 323/48
3,535,611  10/1970  Toulemonde......................... 321/47
3,745,440  7/1973  Lord.................................... 323/48
3,767,998  10/1973  Beling.................................. 321/18

*Primary Examiner*—Gerald Goldberg
*Attorney, Agent, or Firm*—Pierce, Scheffler & Parker

[57] ABSTRACT

An arrangement for providing direct current to a consumer from a supply source of alternating current includes a transformer having its primary side connected to the a.c. supply source and the secondary side connected to a rectifier system from which the d.c. current is fed to the consumer. The secondary side of the transformer includes two windings each of which includes a tap that establishes two partial windings, and these partial windings are connected to a pair of full-wave rectifier bridges, the d.c. output sides of which are connected in series to feed the consumer. Each full-wave rectifier bridge includes both non-controllable valves and also controllable valves of the semi-conductor type such as thyristors, and control means are provided for selectively actuating the controllable valves in a step-like functional relation to the alternating current supply source such that different partial windings and combinations thereof are connected to the bridges to establish a step-like change in the transformation ratio of the transformer and hence also a step-like change in the voltage applied to the rectifier bridges.

10 Claims, 3 Drawing Figures

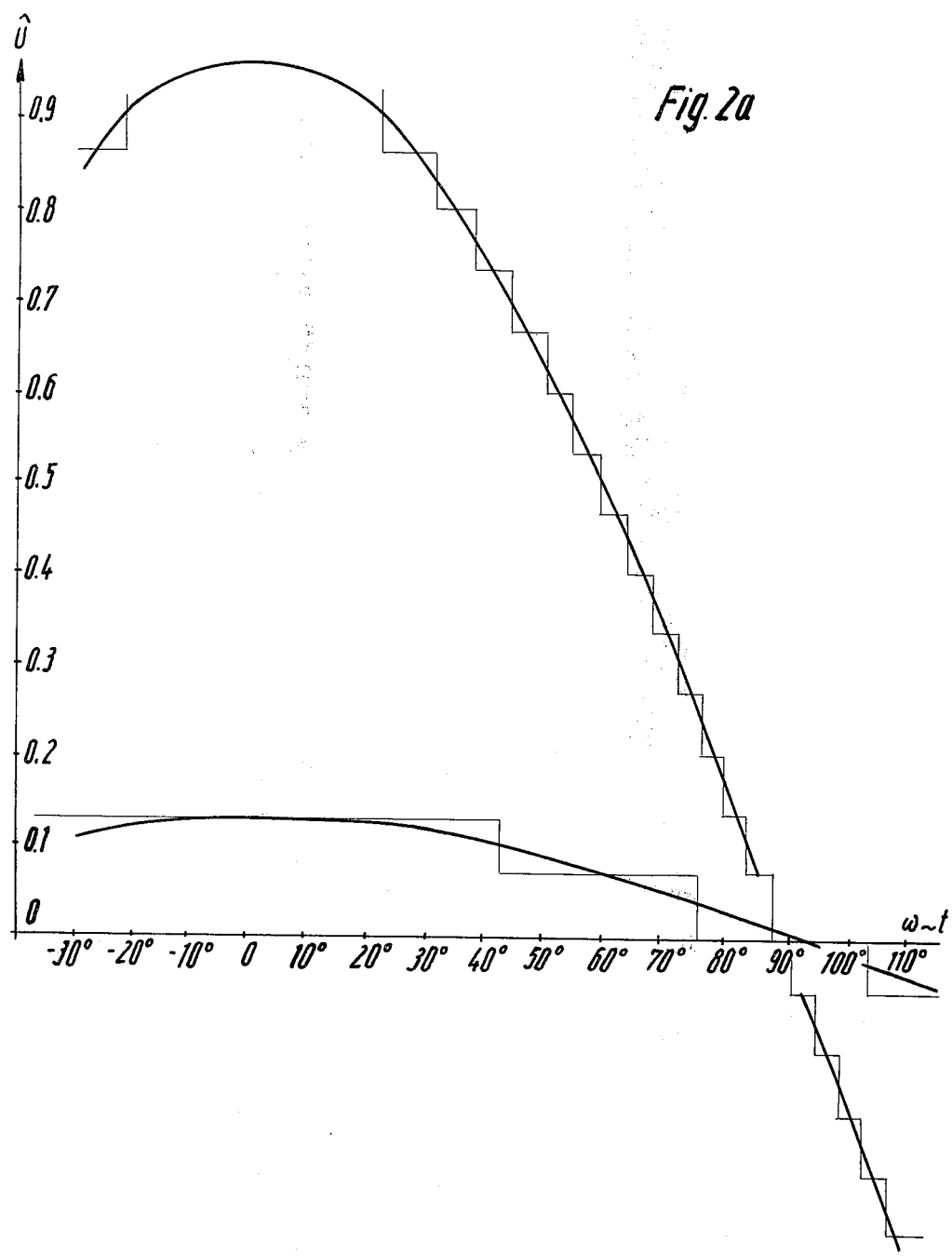

ARRANGEMENT FOR SUPPLYING DIRECT CURRENT TO A CONSUMER FROM AN ALTERNATING CURRENT SOURCE WITH INTERPOSED TRANSFORMER AND RECTIFIER ESTABLISHING PERIODIC RAPID CHANGES IN TRANSFORMATION RATIO

This invention relates to an improved arrangement for supplying direct current, or direct current consumers, from a single- or multi-phase alternating voltage source with a current free from harmonic oscillations and in phase with the supply voltage, and which includes a transformer, a full-wave rectifier of the controllable semi-conductor type, a smoothing system, and a filter tuned to double the frequency of the alternating voltage supply source.

In the case of direct current supply arrangements of the above type it is desirable to draw only active power from the alternating voltage supply source. It is well known that in the case of an entirely active power load on a single-phase alternating voltage supply source, its voltage oscillating in a sinusoidal manner, there is superimposed upon the time-like constant mean power a power component which oscillates sinusoidally at double the frequency of the alternating voltage supply source, its amplitude as large as the time-like constant part of the power.

In order to draw only active power from the alternating voltage supply source, it will be necessary to establish a no-loss transformer without energy storage between the alternating voltage supply source and the rectified direct current side, its transformation ratio changing continuously and being time-synchronized with the alternating voltage.

In the case of the systems now known, it has been attempted to draw active power from the alternating voltage (a.c.) supply source only by an approximation of the desired time curve for the current and voltage on the a.c. side by modulating the width of the consumption intervals at the direct current side.

This has the disadvantage that the controls provided for the semi-conductor rectifier elements, e.g. thyristors, must be designed in such a manner that they will be able to quench the consumer current at the a.c. side completely. Since the circuits always contain inductances, there will be required a properly rated quenching system and a correspondingly over-dimensioned a.c. supply source.

The principal object of the present invention is to provide an improved arrangement of the general type described which avoids the above-mentioned disadvantages and includes a transformer between the a.c. supply source and the direct current (d.c.) side which will not change the full height of the consumer current but which possesses a transformation ratio which is periodically and rapidly changed in a large number of finite steps, thus reducing the necessity for over-dimensioning as well as technical expenses, while retaining its power-handling capacity, reducing - in comparison with the known arrangements - the harmonic content, and increasing the power factor.

This objective is accomplished in that the secondary side of the transformer interposed between the a.c. supply source and rectifier unit includes at least one winding provided with at least one tap, the winding being circuit-associated with a full-wave rectifier designed in the form of a bridge circuit, the rectifier components of the bridge comprising non-regulated semi-conductor valves, e.g. diodes, and also controllable semi-conductor valves, e.g. thyristors, providing positive quenching action, the number of junction points on the winding corresponding to the number of bridge-arm pairs, each mid-point of a bridge-arm pair being connected to one junction point of the winding, and an ignition control device for the controllable semi-conductor valves for rendering them periodically conductive and non-conductive in functional relation to the voltage, or current of the a.c. supply source.

The improved arrangement in accordance with the invention makes it feasible to load the semi-conductor valve control units solely with the difference voltage existing between the individual partial voltages of the various parts of the secondary winding. Furthermore, the current to be quenched is coupled to an effective inductance which is reduced in accordance with the transformation ratio.

It will be advantageous to design the improved arrangement so that the semi-conductor valves are controlled on and off in such manner that the output voltage of the full-wave rectifier approximates a curve having the function:

$$u(t) = \frac{\hat{u}}{k}(1 + \cos 2\omega_\sim t)$$

wherein
$\hat{u}$ represents the crest of the alternating supply voltage
$k$ represents a predetermined maximum transformation ratio, and
$\omega_\sim$ represents the angular frequency of the a.c. supply source.

In this manner it becomes possible to draw from the a.c. supply source a large amount of active power and only a small amount of harmonic, reactive power.

In a particular advantageous embodiment of the invention, the secondary of the transformer comprises two such tapped windings and with each of which there is associated a full-wave controllable semi-conductor rectifier bridge circuit, the two rectifiers being connected in series on the direct current side. In this manner, there is accomplished a finer gradation within the individual partial voltages on the transformer secondary windings, and thus a better approximation to the desired time curves of current and voltage.

The foregoing as well as other objects and advantages inherent in the invention will become more apparent from the following detailed description of a preferred embodiment thereof wherein:

FIG. 2a is a graph illustrating the step-like changes in voltage transformation ratios as a function of time.

Figure 1:
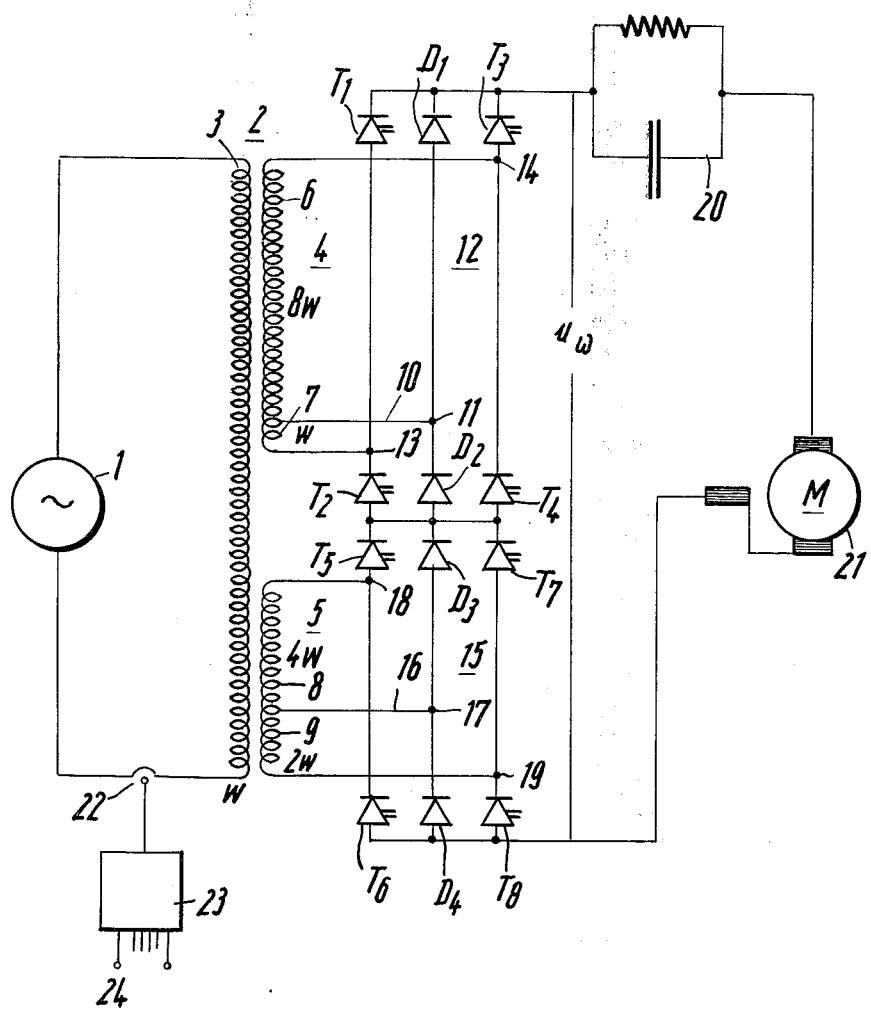
FIG. 1 is a schematic electrical circuit diagram of the improved direct current supply system and its connection to a power consumer illustrated in the form of an electric motor.

With reference now to FIG. 1, a single-phase alternating voltage network serving as the a.c. supply source which is to be converted to d.c. is indicated schematically by component 1. A network transformer 2 includes a primary winding 3 connected to the a.c. supply source 1 and two secondary windings 4 and 5. The first secondary winding 4 is divided into two partial windings 6 and 7 established by an intermediate tap 10, and similarly, the second secondary winding 5 is divided into partial windings 8 and 9 established by an intermediate tap 16.

Assigned to the first secondary winding 4 is a first full-wave rectifier 12 designed in the form of a bridge circuit with the individual bridge-arm pairs composed of positively controllable semi-conductor valves, e.g. thyristors, $T_1$, $T_2$, and $T_3$, $T_4$ and diodes $D_1$, $D_2$ extending between them. The tap 10 is connected to the mid-point 11 between diodes $D_1$ and $D_2$, one end of secondary winding 4 is connected at 13 intermediate the valve pair $T_1$, $T_2$, and the opposite end of secondary winding 4 is connected at 14 intermediate the other valve pair $T_3$, $T_4$.

In an analogous manner, there is assigned to the other secondary winding 5 a second full-wave rectifier 15 likewise designed in the form of a bridge circuit and with the individual bridge-arm pairs consisting of controllable semi-conductor valves $T_5$, $T_6$ and $T_7$, $T_8$ and diodes $D_3$ and $D_4$. Tap 16 at an intermediate point on secondary winding 5 is connected to the mid-point 17 between diodes $D_3$ and $D_4$ of the rectifier bridge 15, one end of secondary winding 5 is connected to the midpoint 18 of the bridge-arm pair composed of valves $T_5$, $T_6$ and the opposite end of secondary winding 5 is connected to the mid-point 19 of the bridge-arm pair composed of valves $T_7$, $T_8$.

The two full-wave rectifiers 12, 15 are connected in series at the direct current output side and feed, by way of a filter 20, tuned to double the frequency of the a.c. supply source 1, the direct current consumer 21 which, in the particular embodiment illustrated is seen to be a series-wound motor. It is to be pointed out that the partial winding 7 is provided with a $w$ number of turns, that partial winding 9 has a number of turns equal to $2w$, that partial winding 8 has a number of turns equal to $4w$, and that partial winding 6 has a number of turns equal to $8w$. That is to say, the number of turns of the partial windings of each secondary winding 4, 5 have a ratio relative to each other of 1:2. Obviously, the ratios of the winding turns are given only as an example, and hence it is possible to provide other embodiments with different ratios of transformation, additional partial windings and larger number of turns.

It will also be noted that the a.c. side of the supply circuit of FIG. 1 includes a measuring instrument 22 which measures current or voltages in the connection between the a.c. supply source 1 and the primary winding 3 of transformer 2. The measured voltage, or current, in-phase in the example shown, is transmitted to a control unit 23 which serves to control, through its output side 24, the controllable semi-conductor valves $T_1$ to $T_8$ of the two full-wave rectifier bridges 12 and 15 which respond accordingly.

The improved a.c. to d.c. feed system functions in the following manner:

At the beginning of a positive half-wave of the a.c. voltage supply, the partial winding 7 of transformer secondary 4 having the smallest number of turns $w$ is first switched to the consumer circuit, i.e. motor 21, by ignition of rectifier valve $T_2$ from the control unit 23. Current then passes through mid-point 11, diode $D_1$, filter 20, consumer 21, diodes $D_4$, $D_3$ and the ignited valve $T_2$ to mid-point 13. Next, the larger partial voltage across partial winding 9 on transformer secondary 5 resulting from the winding ratio $2w$ of partial winding 9 is switched on by quenching valve $T_2$ at the control unit 23 while valve $T_8$ is ignited at the same time. The current now passes through valve $T_8$, mid-point 19, partial winding 9, mid-point 17, diodes $D_3$, $D_2$, $D_1$, filter 20 and consumer 21 back to valve $T_8$. During the next time segment of this first quarter wave, partial winding 7 of transformer secondary 4 is connected in series with partial winding 9 of transformer secondary 5, valve $T_2$ being ignited in addition to valve $T_8$. The partial windings 7 and 9 will now deliver a voltage to the consumer 21 which is three times higher ($w + 2w$) than the partial voltage which could be supplied by the partial winding 7 ($w$) alone. During the next time segment, the partial winding 8 of transformer secondary 5 with a transformation ratio of $4w$ is connected and the series connected partial windings 7 and 9 which together have a $3w$ ratio of transformation are cut off. This is accomplished by ignition of valve $T_5$ and quenching of valves $T_2$ and $T_8$. The current will now pass from mid-point 17, through partial winding 8, mid-point 18, valve $T_5$, diodes $D_2$, $D_1$, filter 20, consumer 21 and diode $D_4$ back to mid-point 17.

In succeeding step-by-step time segments of the voltage rise of the positive half-wave, i.e. through transformation ratios $5w$ to $15w$, various other circuit combinations of the partial windings 6 to 9, controllable valves $T_1$ to $T_8$ and diodes $D_1$ to $D_4$ are established, and these are detailed in the Table provided at the end of the specification which gives the combinations for all ratios from $1w$ to $15w$.

During the course of the next quarter wave period, i.e. as the positive voltage decreases to zero, the ratio of transformation will be reduced in an analogous step-by-step manner from $15w$ to $w$ by the control unit 23 which provides a pattern of the control pulses for ignition and quenching of the rectifier valves in the required reversed sequence.

Figure 2B:
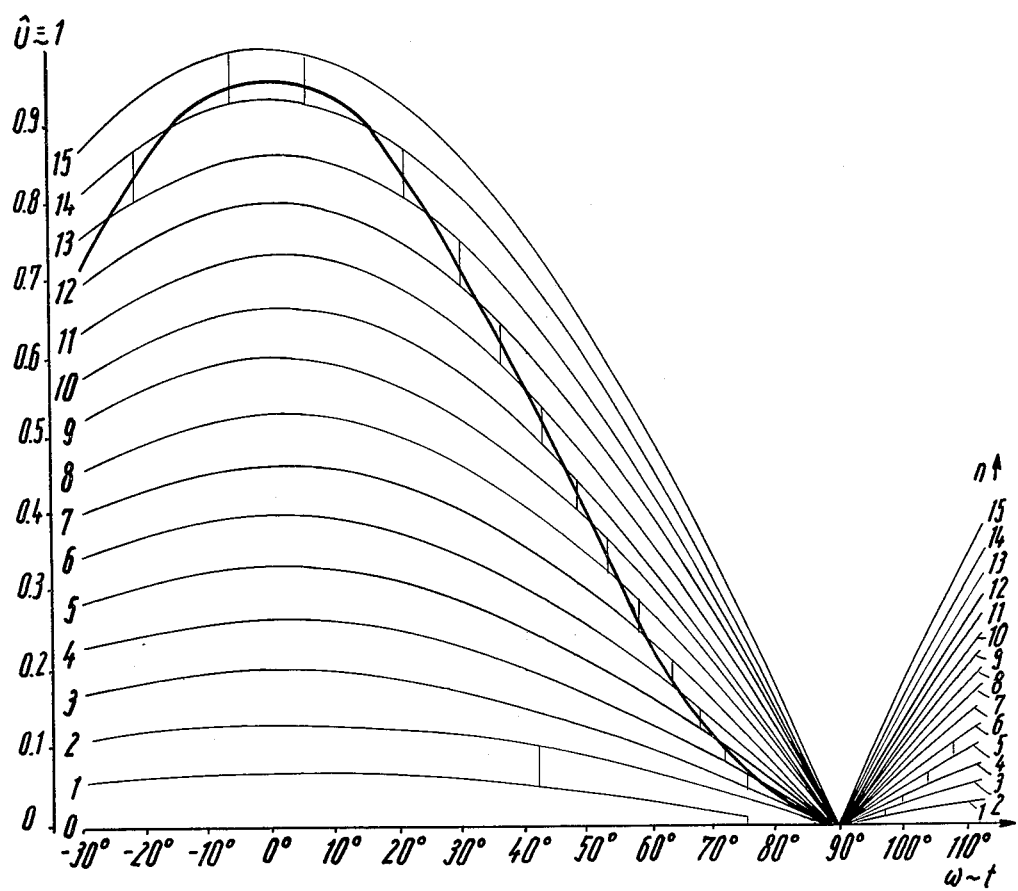
FIG. 2b is a graph illustrating the output voltages on the direct current side as a function of time.

Instead of utilizing the full a.c. amplitude, it is also possible, as illustrated in FIG. 2b, to subject the d.c. consumer 21 to a rate of amplitude that is lower than the maximum, i.e. less than $15w$ for example, by connecting and disconnecting during the course of one period only the partial windings 7, 9 and 7 and 9.

Since the number of turns of the partial windings are at a ratio of 1:2:4:8: in interaction with the bridge-arms, it is possible to arrive at 15 different, continuously variated magnitudes of transformation ratios, as depicted in FIG. 2a.

For the n-th step of transformation, the following formula applies:

$$\ddot{u}_{un} = \frac{n}{15} \cdot \frac{|u\sim|}{u\sim} = \frac{n}{15} \cdot \text{sine } u\sim; n = 0: 1; 2; ... 15$$

In FIG. 2a, there is also plotted the ideal curve $\ddot{u}_{ur} = 2/k \cdot \cos \omega \sim t$ for the two valves $k = 60/29$ and $k = 15$. Also, this ideal curve indicates how, with the aid of the available transformation ratios $\ddot{u}_{un}$, it is feasible to approach closely the ideal curve by the actual voltage ratio $\ddot{u}_u$. By proper selection of the angles $\alpha_1, ... ... . \alpha_n$, at which takes place a change-over from the transformation $\ddot{u}_{un}$ to the transformation having the next lower ordinal number, it becomes possible to arrive at a situation where the step-curve of the transformation $\ddot{u}_u$ contains, in addition to the fundamental oscillation, harmonizing with the ideal curve $\ddot{u}_{ur}$, only harmonics with the odd orders of $v \geq 2n. + 1$. The number $n^*$ is the highest ordinal of the transformation $\ddot{u}_{un}$ which form this step-curve; and FIG. 2a shows that in the case of $k = 60/29$, the value $n^*$ will equal 15; and in the case where $k = 15$, $n^*$ will equal 2. Under these conditions, the actual voltage transformation $\ddot{u}_{un}$ can be represented in the form of a Fourier series as follows:

words at a greatly reduced load voltage, will the approximation step-curve then be provided with a comparatively large number $n^*$ of gradations, with the result that the advantageous conditions, discussed above, concerning currents, voltages and transformation ratios, will also apply.

Table Of Transformation Ratios
And Related Circuitry For Partial
Windings And Rectifier Connections

| Transf. Ratio | In-Circuit Part. Windings | | | | | | | | Current Paths Through The Bridge Circuits For A Quarter-Period Of The A.C. Voltage Supply Wave | | | | | | | |
|---|---|---|---|---|---|---|---|---|---|---|---|---|---|---|---|---|
| | 6 | 7 | 8 | 9 | $D_1$ | $D_2$ | $D_3$ | $D_4$ | $T_1$ | $T_2$ | $T_3$ | $T_4$ | $T_5$ | $T_6$ | $T_7$ | $T_8$ |
| 1w | | x | | x | | x | x | | x | | x | | | | | |
| 2w | | | x | | x | x | x | | | | | | | | | x |
| 3w | | x | | x | x | | x | | | x | | | | | | |
| 4w | | | x | | | x | x | | x | | x | | | x | | |
| 5w | | x | x | | x | | | | x | | x | | | x | | |
| 6w | | | x | x | x | x | | | | | x | | | x | | x |
| 7w | | x | x | x | x | | | | | x | | | x | | x | |
| 8w | x | | | | | x | x | x | | x | | | | | | |
| 9w | x | x | | | | x | x | | x | x | | | | | | |
| 10w | x | | | x | | x | x | | | x | | | | | | x |
| 11w | x | x | | x | | x | | | x | x | | | | | | x |
| 12w | x | | x | | | x | | | x | | x | | x | | | |
| 13w | x | x | x | | | | | | x | | x | x | | x | | |
| 14w | x | | x | x | x | | | | | | x | | | x | | x |
| 15w | x | x | x | x | | | | | x | x | | | x | | | |

$$\ddot{u}_u = \frac{2}{k} \cos \omega\!\sim\! t + \Sigma a_\nu \cdot \cos \eta\, \omega\!\sim\! t;$$

$$v = (2 n^* + 1) + 2z;\ z = 0;\ 1;\ 2;\ 3;\ \ldots$$

The voltage $\ddot{u}_u$ across the series connection of filter 20 and consumer 21 is obtained as the product from the a.c. supply voltage $u\!\sim\ = \hat{u}\!\sim\ \cdot \cos \omega\!\sim\! t$ and the voltage transformation $\ddot{u}_u$, as defined in the above-given equation:

$$u_{\ddot{u}} = \frac{\hat{u}\!\sim}{k}(1 + \cos 2\,\omega\!\sim\! t) + \frac{\hat{u}\!\sim}{2}\Sigma_\nu\ a_\nu\ [\cos(\eta-1)\omega\!\sim\! t + \cos(\nu+1)\omega\!\sim\! t$$

$$v = (2n^* + 1) + 2z;\ z = 0;\ 1;\ 2;\ 3;\ \ldots$$

The voltage $\ddot{u}_u$ of the rectifiers, arising on the direct current side and plotted in FIG. 2b, contains the following components:

a constant voltage $u/k = u-$
an a.c. voltage $u. \cos 2\,\omega\!\sim\! t$ which oscillates at double the frequency of the a.c. supply voltage, and
a distorted a.c. voltage which contains only harmonics with the even ordinal numbers $v \geq 2n^*$.

The characteristics of the parallel resonant circuit 20 can easily be adjusted to the inductance of the direct current consumer in such manner that the resulting impedance for all the additional voltage harmonics will be sufficiently high, so that the resulting load current can be accepted as being practically smooth.

If it is desired to attain a close approximation to an ideal mode of operation, especially over a broad range of load voltage adjustment, it might be advantageous to select a geometrical gradation for the transformation ratios of the rectifier in place of an arithmetic gradation. Even in the case of small values $2/k$, in other

I claim:

1. In an arrangement for providing direct current to a consumer from a supply source of alternating current which includes a transformer having its primary side connected to said alternating current supply source and its secondary side connected to a rectifier system from which direct current is fed to the consumer through a filter tuned to double the frequency of the alternating current supply source, the improvement wherein the secondary side of said transformer includes at least one winding having at least one tapped junction point intermediate the end junction points thereof, wherein said rectifier system is constituted by a full-wave rectifier bridge for each such tapped secondary winding including non-controllable valves and valves of the controllable semi-conductor type, wherein the number of junction points of each such secondary winding corresponds to the number of bridge-arm pairs, wherein each mid-point of a bridge-arm pair is connected to one junction point of the secondary winding, and wherein control means are provided for selectively actuating the controllable semi-conductor valves of each such bridge circuit in functional relation to the alternating current supply source so as to effect a step-like increase in the transformation ratio of said transformer and hence also the voltage applied to said rectifier system by said one or more tapped secondary windings.

2. An arrangement as defined in claim 1 for providing direct current to a consumer from a supply source of alternating current wherein the secondary side of said transformer is provided with two tapped windings, and where the two full wave rectifier bridges correlated respectively to said secondary windings are connected in series at the direct current output side thereof.

3. An arrangement as defined in claim 1 for providing direct current to a consumer from a supply source of alternating current wherein said control means so actuate the controllable semi-conductor valves of each such rectifier bridge that the output voltage of the rectifier bridge approximates a curve having the function $$u(t) = \frac{\hat{u}}{k}(1 + \cos 2\omega\sim t)$$

wherein:
- $\hat{u}$ represents the crest of the alternating supply voltage
- $k$ represents a predetermined maximum transformation ratio, and
- $\omega\sim$ represents the angular frequency of the alternating current supply source 4. An arrangement as defined in claim 3 for providing direct current to a consumer from a supply source of alternating current wherein the opposite ends of each such secondary winding and the winding tap are used as junction points, wherein bridge-arm pairs constituted by controllable semi-conductor valves are connected respectively to the ends of each such secondary winding and wherein a bridge-arm pair constituted by non-controllable valves is connected to the tap on each such secondary winding.

5. An arrangement as defined in claim 4 for providing direct current to a consumer from a supply source of alternating current wherein the secondary side of said transformer is provided with two tapped windings and wherein corresponding partial windings of each said secondary winding established by the respective taps thereon have a turns ratio of 1 : 2.

6. An arrangement as defined in claim 5 for providing direct current to a consumer from a supply source of alternating current wherein the partial windings of one of said secondary windings have a turns ratio of 1w : 8w, wherein the partial windings of the other secondary winding have a turns ratio of 2w : 4w and wherein w represents the number of turns on the partial winding having the smallest number of turns.

7. An arrangement as defined in claim 5 for providing direct current to a consumer from a supply source of alternating current wherein said control means functions to actuate said controllable semi-conductor valves of each said rectifier bridge in such manner as to establish different transformation ratios during a half-cycle of the alternating current supply source and with the output voltage of the full-wave rectifier comprising differently transformed sections of the alternating current supply source.

8. An arrangement as defined in claim 7 for providing direct current to a consumer from a supply source of alternating current wherein during a first quarter-cycle of the alternating current supply source the output voltage of said full-wave rectifiers increases in a step-like manner from the lowest transformation ratio represented by one partial winding on the secondary side up to the maximum transformation ratio represented by a series connection of all of said partial windings, and wherein during the next quarter-cycle the output voltage of said full wave rectifiers decreases in the same step-like manner from maximum to minimum.

9. An arrangement as defined in claim 8 for providing direct current to a consumer from a supply source of alternating current wherein the highest transformation ratio in the step-like change is fifteen times larger than the lowest.

10. An arrangement as defined in claim 1 wherein said filter is constituted by a combination of inductance and capacitance connected in parallel and which is resonant at double the frequency of the alternating current supply source.

* * * * *